A. D. BACK.

BAG HOLDER.

APPLICATION FILED DEC. 3, 1913.

Reissued Apr. 3, 1917.

14,279.

2 SHEETS—SHEET 1.

WITNESSES:

John G. Schroot

Charles Diller

INVENTOR

A. D. Back

BY

Fred G. Dieterichs

ATTORNEYS.

THE NORRIS PETERS CO., PHOTO-LITHO., WASHINGTON, D. C.

A. D. BACK.

BAG HOLDER.

APPLICATION FILED DEC. 3, 1913.

Reissued Apr. 3, 1917.

14,279.

2 SHEETS—SHEET 2.

WITNESSES:

John T. Schrott

Charles Diller.

INVENTOR

A. D. Back

BY

Fred G. Dieterich Co.

ATTORNEYS.

THE NORRIS-PETERS CO., PHOTO-LITHO., WASHINGTON, D. C.

UNITED STATES PATENT OFFICE.

ARTHUR D. BACK, OF JUNEAU, TERRITORY OF ALASKA.

BAG-HOLDER.

14,279. Specification of Reissued Letters Patent. Reissued Apr. 3, 1917.

Original No. 1,038,474, dated September 10, 1912, Serial No. 681,676, filed March 5, 1912. Application for reissue filed December 3, 1913. Serial No. 804,525.

*To all whom it may concern:*

Be it known that I, ARTHUR D. BACK, a citizen of the United States, residing at Juneau, in the first division of the Territory of Alaska, have invented certain new and useful Improvements in Bag-Holders, of which the following as a specification.

My invention relates to an improvement in bag holders, and the object is to provide a simple device for holding paper bags or sacks in convenient position to be quickly and easily removed by the merchant while serving a customer; and a further object is to provide a holder which may be easily replenished with more bags or sacks.

The invention, in its preferred form, also resides in providing means whereby the bottom of the bag may be exposed through an opening in the holder which is of greater area than that of the bag bottom, and to so press the bags toward such opening, and to so restrain the lower edge of the bag, as to bulge the bag bottoms through the opening and thereby cause the bottom to partly open out and to project with its upper end outwardly beyond the plane of the holder opening so as to be readily susceptible of being grasped by the fingers of the user.

Another object is to provide means to directly engage the follower spring and hold it inactive while loading the holder.

With these objects in view, this invention consists in certain novel features of construction and combination of parts which will be hereinafter described more fully and set forth in the claims.

I have illustrated my invention in two forms, and in the accompanying drawings.

Figure 1:
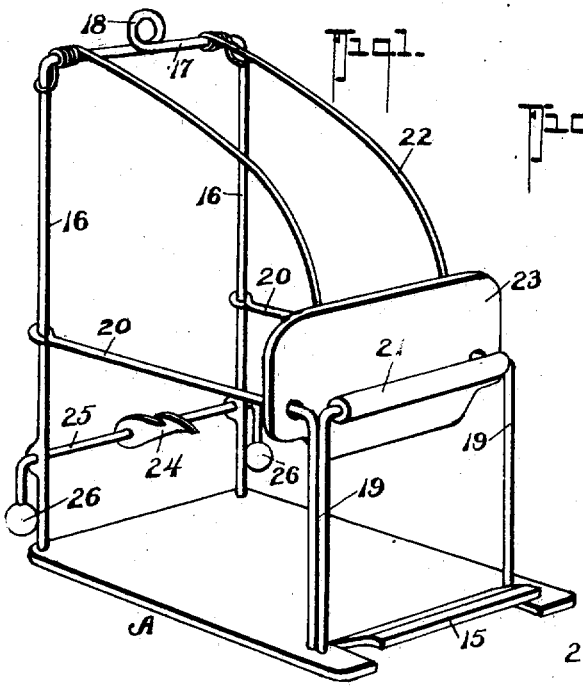
Figure 1 illustrates a perspective view of one form of the invention.
Figure 3:
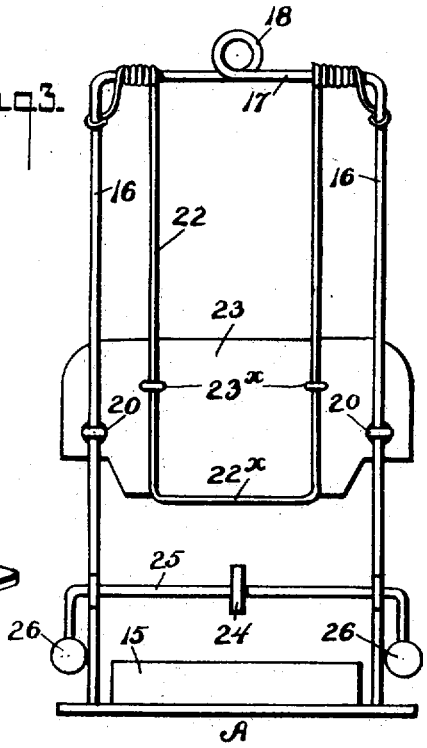
Fig. 3 is a rear view.
Figure 2:
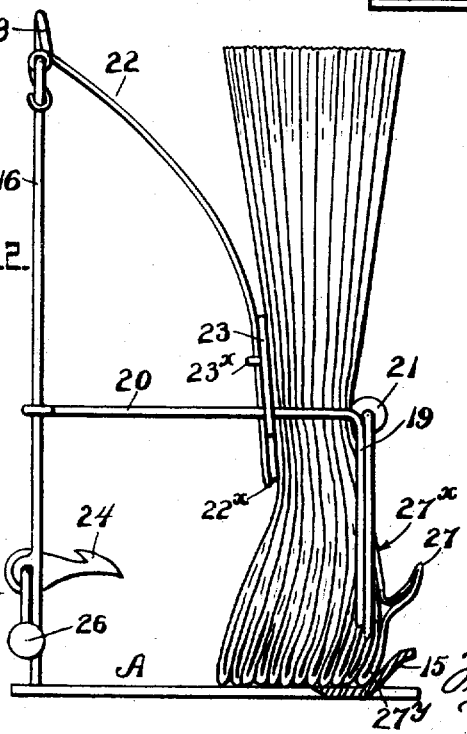
Fig. 2 is a side view of the same showing bags in position.

A, is the base, preferably made of a sheet of metal recessed at the forward end to form a narrow, upturned lip 15, the function of which will be hereinafter explained. A frame-work of wire is erected on the base, and comprises two long uprights 16, 16, connected by a cross-bar 17 at the top, which has an eyelet 18 in the center whereby the holder may be suspended on a nail or hook, two shorter uprights 19, 19, at the front, and two side-bars 20, 20, connecting the upper ends of the short uprights with the longer uprights 16, 16, and a roller 21 extends across from one of the shorter uprights to the other in front of the holder. A U-shaped spring 22 extends downwardly from the cross-bar 17 and presses forwardly toward the roller and has a shield or follower 23 slidably connected therewith and with the side-bars 20, 20, on which the follower is preferably loosely mounted. A curved catch 24 is centrally secured to a pivoted cross-bar 25, having counterweights 26, 26, on its ends in position to automatically engage the spring when the latter and the shield or follower are forced back when it is desired to replenish the holder. When thus adjusted, the space between the shield and the roller and the side-bars 20, 20, is filled with bags or sacks after which the weights are lifted and the spring is allowed to press the shield or follower forward against the bags or sacks, holding them compressed between it and the roller and the lip 15, the function of which latter is to cause the upper edge 27 of the folded bottom of the outermost bag to extend outwardly where it is convenient for the operator to grasp it when he desires to remove a bag or sack from the holder, as clearly shown in Fig. 2. It is to be noted as best indicated in Fig. 2 that by reason of the fact that the follower 23 is loosely mounted on the rods 20, and by reason of the fact that the spring 22 is slidably secured to the back of the follower 23 as at $23^x$, the securing means being above the bars 20, the follower 23 will lean backward slightly as shown in Fig. 2 and thus have a tendency to push that portion of the bags below the side bars 20 outwardly. This pushing of the lower ends of the bags outwardly would ordinarily tend to project the entire bag bottom out of the front opening of the device, but this act is restrained by the upturned lip 15 which moves the lower end of the bag backwardly, as at $27^y$, in Fig. 2, and thus opens up the upper half of the bag bottom to cause the upper edge 27 to extend outwardly beyond the bulge $27^x$ and thereby form a free and easy "tab" by means of which the outermost bag may be grasped and widthdrawn from the holder. This greatly facilitates the operation of grasping and removing a bag, and the roller also reduces the friction which would otherwise be caused by the pressure exerted by the springs upon the bags.

The latch 24 is provided for the purpose of holding back the spring 22. It will be observed that by reason of the loose connection between the spring 22 and the follower 23, and by reason of the fact that the follower 23 moves along the bars 20 in a horizontal direction, the lower end $22^x$ of the spring 22, will project downwardly beyond the follower 23 when the follower is pushed backwardly along the bars 20 and come in contact with the latch 24 which hooks over the lower end $22^x$ of the spring at this time and holds the spring and follower back while bags are being inserted.

Figure 4:
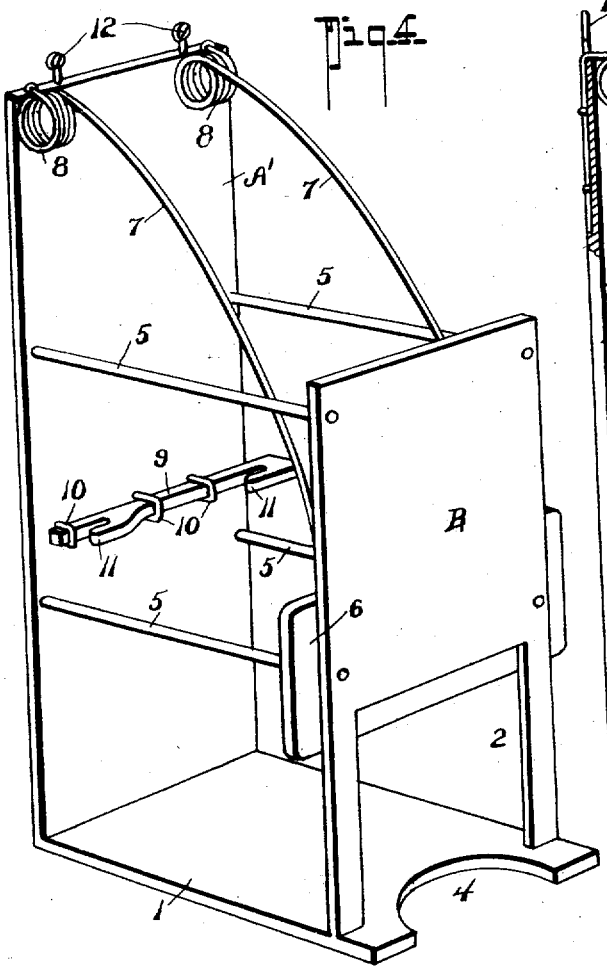
Fig. 4 is a perspective view of the other illustrated form of my invention.
Figure 5:
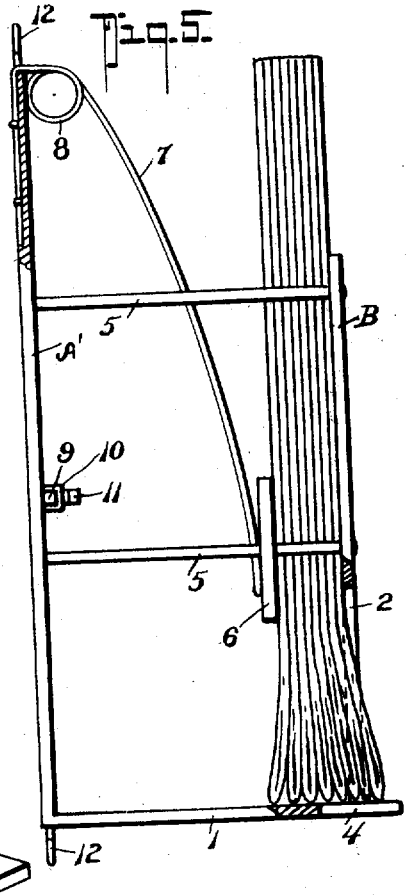
Figs. 5 and 6 are side and horizontal sectional views respectively of the latter form of bag holder.
Figure 6:
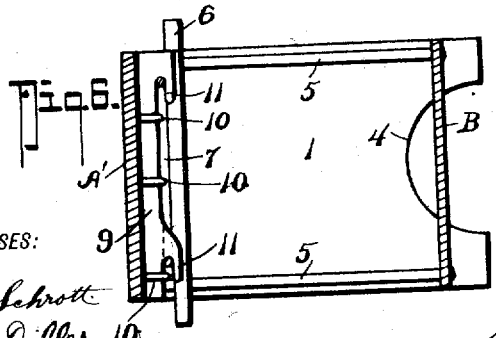

In the form shown in Figs. 4, 5, and 6, A′ is the back; B, the front; 1, is the base, all made preferably of thin wood; and 2, indicates a slot, and 4, a notch at the front through which the bags are removed; and 5, 5, are the cross-bars connecting front and back; 7, 7, indicate the spring; and 8, 8, the coils; and 6, is the follower or shield which compresses the bags or sacks and holds them in their upright position as shown in Fig. 5. Slide 9 operating through guides 10, 10, has hooks 11, 11, to engage the spring 7, 7, when the spring is moved rearward and compressed for clearing the space to replenish the holder.

The device is supported by mails or screws inserted through the hooks or eyelets 12, 12, at the top of the upper edge of the back A′.

From the foregoing, it will be seen that I have provided a very simple and inexpensive article of manufacture for holding bags in convenient place where they may be quickly removed, which is a desideratum as much time is ordinarily lost by the merchant in manipulating these bags which by means of which device is reduced to a minimum.

Having fully described my invention, what I claim as new and desire to secure by Letters Patent, is:—

1. A bag holder comprising a frame including a base, a back, a front, and sides, a shield or follower, said frame including means on which said shield or follower is loosely and slidably mounted to move in a direction parallel to the base, a spring secured to the frame and slidably engaging the shield or follower, and a latch device mounted on the frame in a position below the shield or follower, said spring adapted to project with its lower end below said follower when said spring is compressed into engagement with said latch.

2. A bag holder comprising a base, a back, a front, and side members, the front member having a bag opening of greater area than the area of the bottom of the bag, a lip projecting upwardly and forwardly from the base at the front opening and extending beyond the plane of the front opening and a spring compressed follower for engaging the bags to press the folded bottoms through said opening and against said lip whereby the folded bottom of the exposed bag will open up and lie in a direction to hold the upper edge of the folded bottom of the bag away from the bag proper to facilitate grasping.

3. A bag holder comprising a frame including back, front, and side bars, a shield or follower loosely and slidably mounted on two of said side bars, said frame having an opening in the front through which the lower or bottom ends of the bags are adapted to be pressed, a spring secured to said frame and engaging the back of said follower, means for slidably connecting said spring to said follower, said connecting means lying at a place above the plane of the side bars on which said follower is mounted whereby said follower will be tilted backward from a vertical plane to thereby cause said follower to bulge the bag bottoms through said front opening, and a restraining lip on the bottom of said holder to engage the lower ends of the bag bottoms and hold the same backwardly while the upper ends of the bag bottoms are opened outwardly at the "bulge" to facilitate grasping.

ARTHUR D. BACK.

Witnesses:
E. R. Sims,
Howard Bennett.

Copies of this patent may be obtained for five cents each, by addressing the "Commissioner of Patents, Washington, D. C."